M. Baumgarten,
Pipe Organ,

Nº 55,573. Patented June 12 1866.

Witnesses
M. A. Hine
John H. Shumway

Inventor
Moritz Baumgarten
his atty
John E. Earle

UNITED STATES PATENT OFFICE.

MORITZ BAUMGARTEN, OF NEW HAVEN, CONNECTICUT, ASSIGNOR TO HIMSELF, JACOB HELLER, G. C. CLARK, A. S. KEELER, AND MORRIS STEINHERT, OF SAME PLACE.

VALVE ARRANGEMENT FOR ORGANS, &c.

Specification forming part of Letters Patent No. 55,573, dated June 12, 1866.

*To all whom it may concern:*

Be it known that I, MORITZ BAUMGARTEN, of New Haven, in the county of New Haven and State of Connecticut, have invented a new and useful Improvement in Valve Arrangements for Organs, &c.; and I do hereby declare the following, when taken in connection with the accompanying drawings and the letters of reference marked thereon, to be a full, clear, and exact description of the same, and which said drawings constitute part of this specification, and represent, in—

Figure 1:
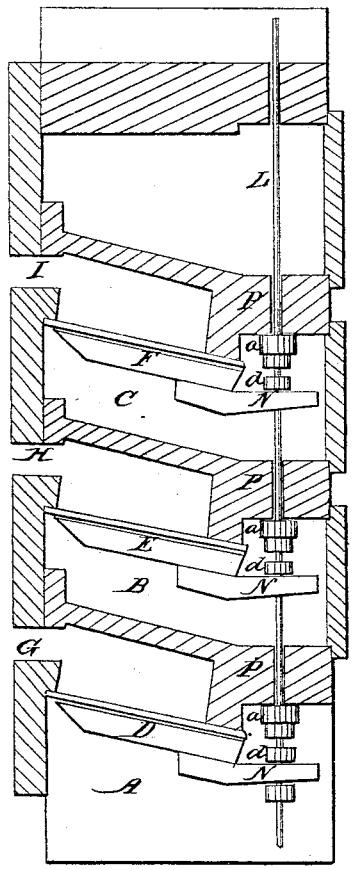
Figure 2:
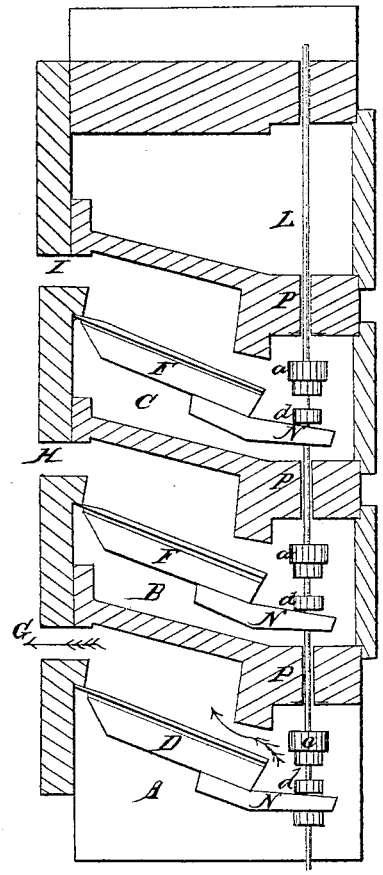
Figure 3:
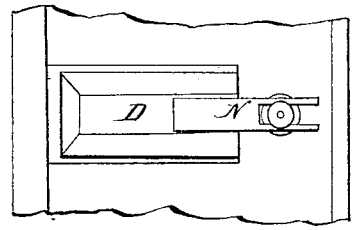

Figure 1, a section of three wind-chambers with the valves closed; Fig. 2, a similar section with the valves open, and in Fig. 3 a back-side view of a single valve.

My invention relates to an improvement in the construction of the valve-seats, whereby the necessity of a spring to each valve is avoided; also, in an improvement in the manner of operating the valves.

To enable others skilled in the art to construct and use my improvement, I will proceed to describe the same as illustrated in the accompanying drawings.

A, B, and C are three wind-chambers. D, E, and F are valves which are open to permit the wind to pass from the wind-chambers to their respective pipes or reeds G, H, and I. Heretofore these valves have been hung perpendicularly, so that they required a spring to close them. To avoid the necessity of such springs I make the valve-seats inclined, as seen in Fig. 1, so that the weight of the valves is all-sufficient to perfectly close them; which constitutes the first part of my invention.

Heretofore the valves have been operated by a bell-crank lever to each valve, making a great combination of joints, expensive and difficult to be kept in working order. I do away with these many cranks by passing a single rod, L, through the several wind-chests and through an arm, N, upon each valve, making the hole in the partition P between the wind-chamber, and through which the rod L passes, only large enough to permit the rod L to move freely therein. As this small space around so many wires would permit sufficient wind to pass from one chamber to another to sound the pipes from each chamber, I place upon the several rods, L, collars *a*, made from felt or like soft substances, which set closely upon the partition P around the said rod, and prevent the wind from passing from one chamber to another. The opening made by three or four of the rods moved to open the valves is not sufficient to affect in the least the pipes in the chamber cut off from the wind. Upon the said rod I place nuts *d*, which, when the rod L is moved, as from the position shown in Fig. 1 to that in Fig. 2, will open the several valves operated by the said rod, as denoted in said Fig. 2. The wind being cut off from the two chambers B and C, and only admitted to the chamber A, will pass therefrom, as denoted by arrows, to the pipes or reeds to which the valve D opens. The operation is the same whether one or all the chambers are open to receive the wind. The said rod L is operated by a single crank directly from its own key, which completes the second part of my invention; and I am by these improvements enabled to dispense with a large proportion of the mechanism required in instruments as commonly constructed.

I do not wish to be understood as claiming operating several valves in as many different wind-chests by a single rod, as such is not new. Among numerous instances of such arrangements may be mentioned the patent of E. P. Needham, April 12, 1859, the object of my invention is to make the rod which operates the several valves in as many wind-chests self-packing between the several wind-chests, so that the wind from one cannot pass from one to the other.

Having therefore thus fully described my improvement, what I claim as new and useful, and desire to secure by Letters Patent, is—

The arrangement of the rod L, provided with packing-collars *a*, in combination with valves D, E, and F, more or less substantially in the manner and for the purpose herein described.

MORITZ BAUMGARTEN.

Witnesses:
JOHN E. EARLE,
M. A. HINE.